(12) United States Patent
Gowda et al.

(10) Patent No.: US 6,442,053 B1
(45) Date of Patent: Aug. 27, 2002

(54) MOSFET RECTIFIER CIRCUIT WITH OPERATIONAL AMPLIFIER FEEDBACK

(75) Inventors: Sudhir M. Gowda, Briarcliff Manor; Scott K. Reynolds, Granite Springs, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/753,311

(22) Filed: Dec. 29, 2000

(51) Int. Cl.[7] .............................................. H02M 7/217
(52) U.S. Cl. ........................................ 363/127; 327/538
(58) Field of Search ................................ 363/127, 125; 327/538, 531

(56) References Cited

U.S. PATENT DOCUMENTS 4,409,500 A * 10/1983 Welland ...................... 307/490
5,068,595 A * 11/1991 Kearney et al. ............. 323/316
5,668,468 A *  9/1997 Cargill ........................ 323/316

\* cited by examiner

*Primary Examiner*—Adolf Deneke Berhane
(74) *Attorney, Agent, or Firm*—Ference & Associates (57) ABSTRACT

A circuit arrangement for rectifying alternating current (AC) signals in solid-state technologies that have gain devices with low transconductance. A contemplated circuit uses operational amplifiers connected in feedback mode to enhance the effective transconductance of the gain devices.

11 Claims, 11 Drawing Sheets

MOSFET RECTIFIER CIRCUIT WITH OPERATIONAL AMPLIFIER FEEDBACK

FIELD OF THE INVENTION

The present invention relates generally to circuitry used to obtain rectified signals in any application requiring the derivation of such signals from AC signals.

BACKGROUND OF THE INVENTION

Figure 1A:
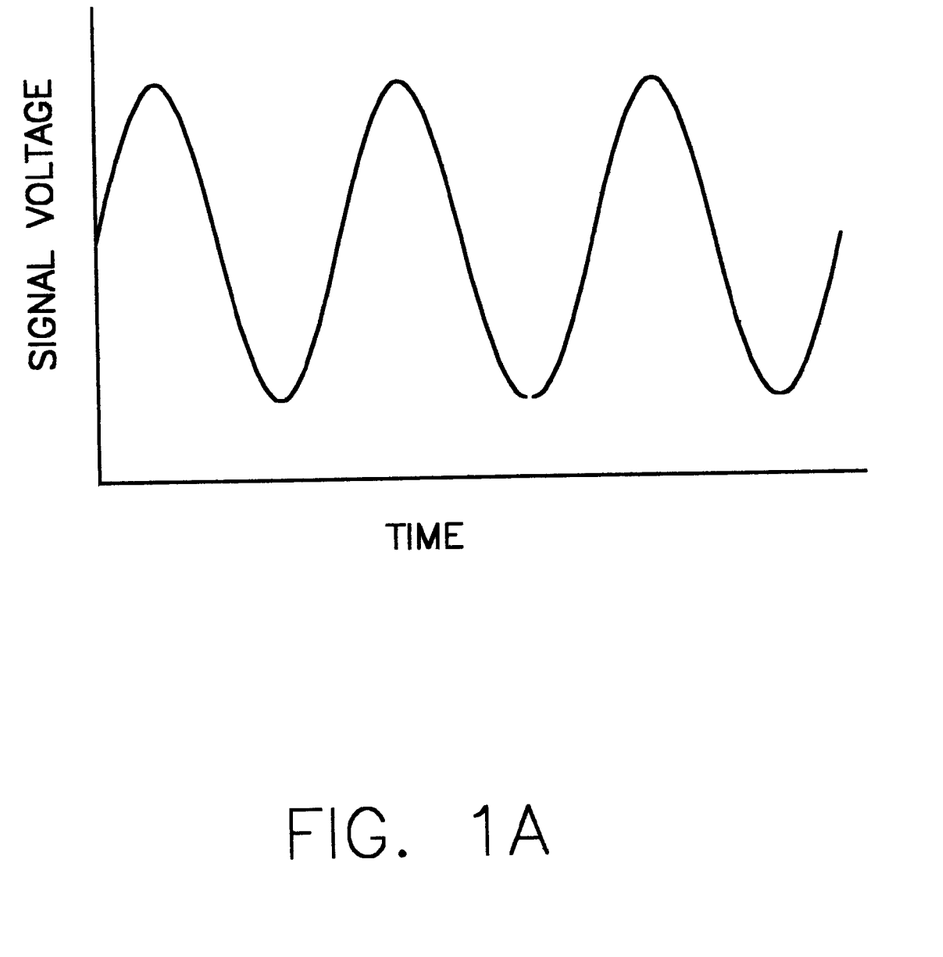
FIG. 1(a) is a graph of signal voltage vs. time for a sinusoidal input waveform.
Figure 1B:
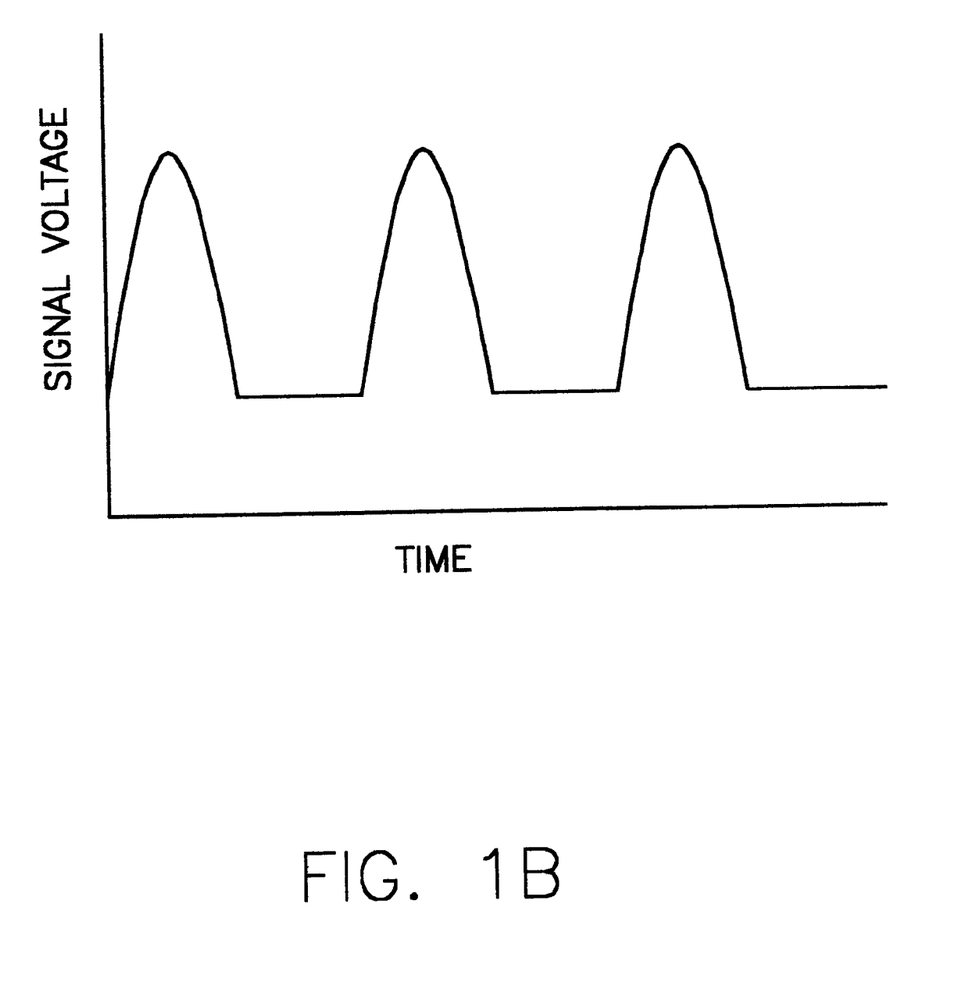
FIG. 1(b) is a graph of simulated output signal voltage vs. time for an ideal half-wave rectifier.
Figure 1C:
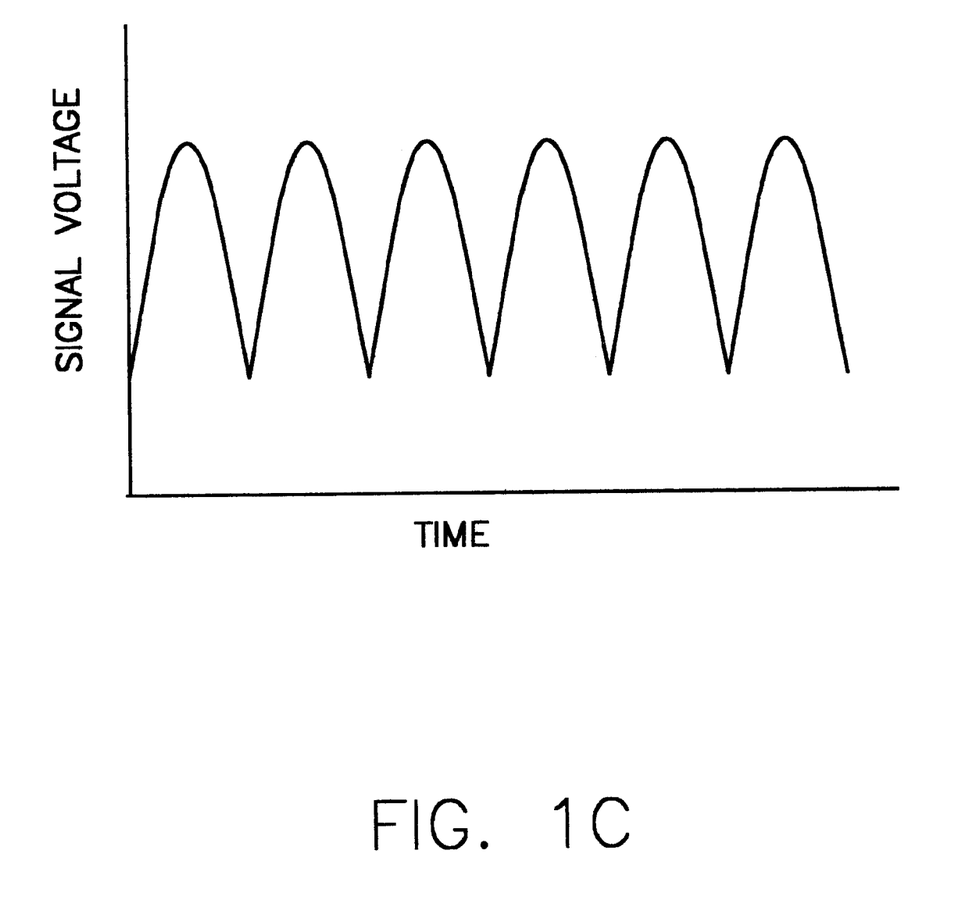
FIG. 1(c) is a graph of simulated output signal voltage vs. time for an ideal full-wave rectifier.

Generally, the function of a rectifier circuit, as contemplated herein, is to take a signal which has both positive and negative varying amplitudes about some reference, and convert that signal into one which has only positive varying amplitudes about the same or other reference. If the circuit preserves the positive signal and also mirrors the negative signal to be positive with respect to the reference, it is called a full-wave rectifier. If the circuit preserves only the positive signal and deletes the negative signal, it is called a half-wave rectifier. Examples of a sinusoidal input waveform, and ideal half-wave and full-wave rectified waveforms are shown in FIG. 1(a), FIG. 1(b), and FIG. 1(c), respectively.

Figure 2A:
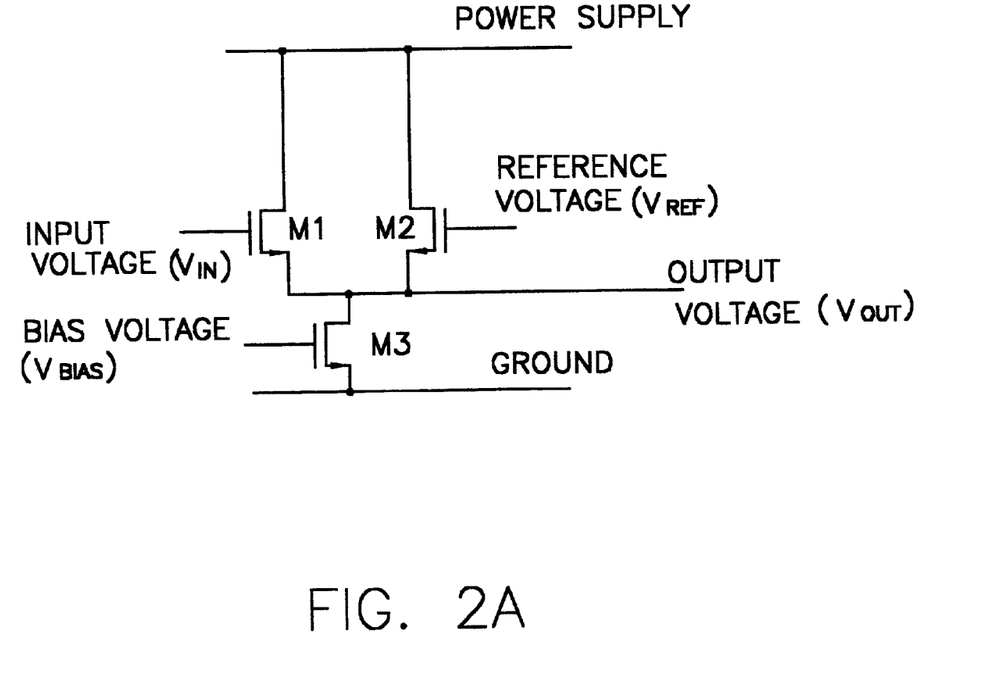
FIG. 2(a) illustrates a conventional half-wave rectifier circuit using FET devices ("Rectifier A").

The general principle in a rectifier circuit is to first compare the input signal with a reference signal. If the input signal is positive with respect to the reference, then it is simply passed through to the output of the circuit. If the input signal is negative with respect to the reference, then it is inverted with respect to the reference and passed through to the output in the case of a full-wave rectifier. In the case of a half-wave rectifier, the negative signal is simply deleted or blocked from passing through to the output of the rectifier. FIG. 2(a) shows a conventional half-wave rectifier circuit (Rectifier A) which is based on this principle, using metal-oxide-semiconductor field effect transistor (MOSFET) devices in the rectifying stage. The circuit includes a transistor M1 which has the input voltage (Vin) applied to the gate, a transistor M2 which has the reference voltage (Vref) applied to the gate, and a transistor M3 which has a bias voltage Vbias applied to the gate. The transistors M1 and M2 are coupled at the source and drain. The common drain is connected to the positive supply. The common source is connected to the drain of the current source FET (M3). The current source FET (M3) ensures that the sum of currents in M1 and M2 remains a constant, independent of Vin and Vref The output voltage (Vout) is measured at the common source node of M1 and M2.

The conventional circuit illustrated in FIG. 2(a) (and as described in more detail in Z. Wang, "Full-wave rectification that is performed in current domain and very suitable for CMOS implementation", IEEE Transactions on Circuits and Systems—I: Fundamental Theory and Applications, vol. 39, no. 6, pp. 456–463, June 1992), operates on the principle that the source of a FET tracks the drain voltage if the device remains biased in the saturation region of its operation. As Vin approaches Vref and crosses it, there is a region of transition when both devices M1 and M2 are on. This transition region affects the performance of the rectifier adversely. The extent of this region depends on the gain in devices M1 and M2.

Figure 2B:
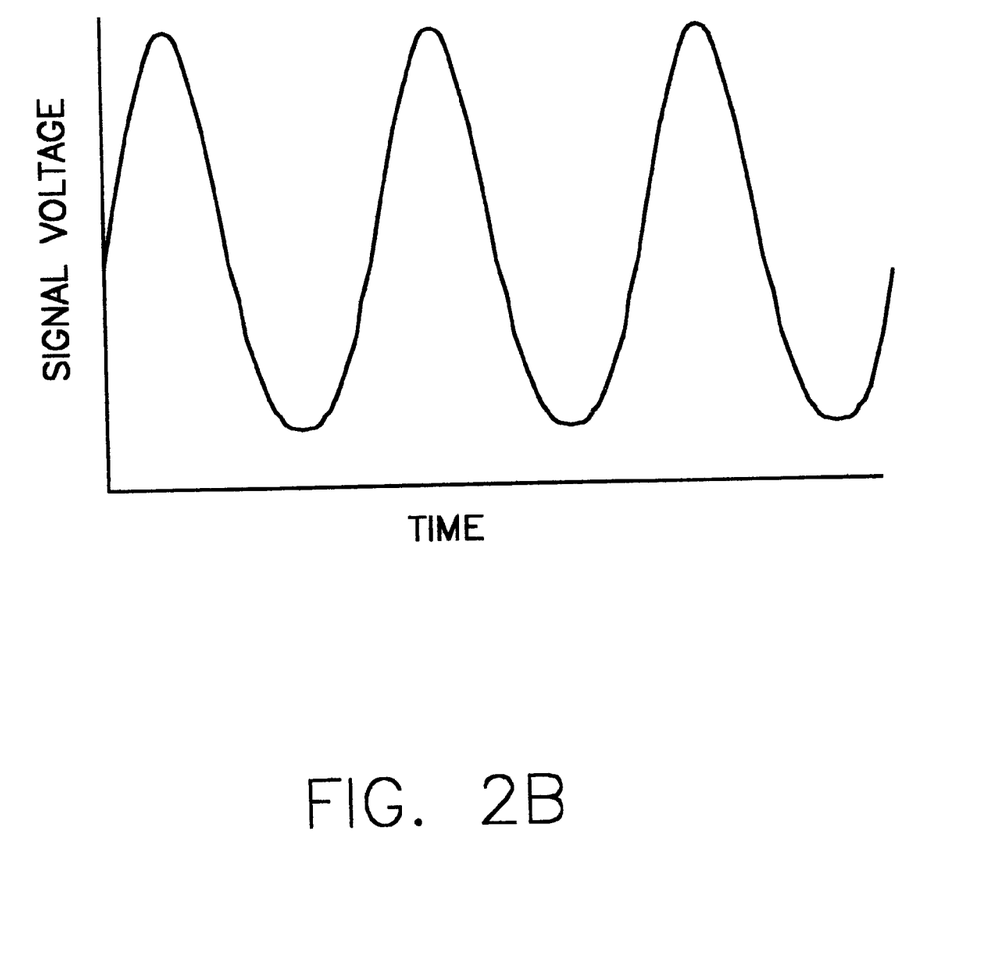
FIG. 2(b) is a graph of simulated output signal voltage vs. time for the rectifier of FIG. 2(a).

In certain semiconductor technologies, particularly those with minimum feature sizes of 0.2 micrometer or less, the field effect transistors (FETs) have low transconductance (a measure of gain through the device) for low values of the gate overdrive voltage. FIG. 2(b) is the simulated output waveform when the sinusoidal input shown in FIG. 1(a) is applied to the circuit schematic shown in FIG. 2(a), the circuit having been designed in a deep submicron complementary metal-oxide-semiconductor (CMOS) semiconductor technology. The MOSFET device performance in this technology is typical of those that have been optimized for performance in digital circuits. As the waveform in FIG. 2(b) shows, the half-wave rectifier does not adequately block the negative-going part of the waveform. This is because the low gain in the MOSFETs M1 and M2 cause them to turn off very slowly when the input sinusoidal waveform is applied.

A need has thus been recognized in connection with overcoming the problem described above and with designing rectifier circuits using FETs or other similar devices with low gain.

SUMMARY OF THE INVENTION

In accordance with at least one presently preferred embodiment of the present invention, a circuit arrangement is contemplated for rectifying alternating current (AC) signals in solid-state technologies that have gain devices with low transconductance. A contemplated circuit uses operational amplifiers connected in feedback mode to enhance the effective transconductance of the gain devices.

In one aspect, the present invention provides a rectifier circuit comprising: a current source; at least one transistor connected with the current source; and an operational amplifier connected with the at least one transistor.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 3A:
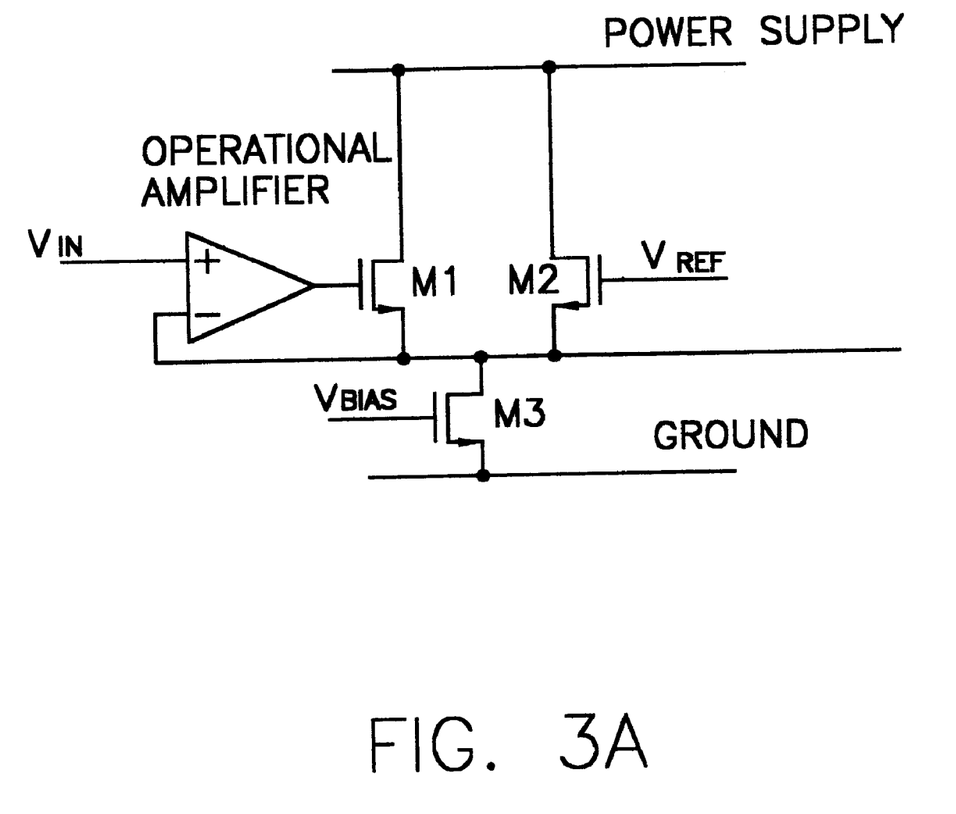
FIG. 3(a) illustrates a half-wave rectifier circuit with operational amplifier feedback ("Rectifier B").

In accordance with at least one presently preferred embodiment of the present invention, a circuit modification is contemplated which overcomes the limitations of the conventional circuit shown in FIG. 2(a) ("Rectifier A"). Accordingly, FIG. 3(a) shows a circuit schematic of a rectifier circuit ("Rectifier B") in accordance with an embodiment of the present invention described here. It preferably includes a source-coupled pair of transistors (M1 and M2), connected to the drain of a current source transistor (M3) as in the case of Rectifier A (FIG. 2(a)). The input voltage (Vin) is not connected directly to the gate of M1. It is connected to the positive input of an operational amplifier (O1). The negative input of O1 is connected to the common source-coupled node of M1 and M2. The output of O1 is connected to the gate of transistor M1.

Figure 3B:
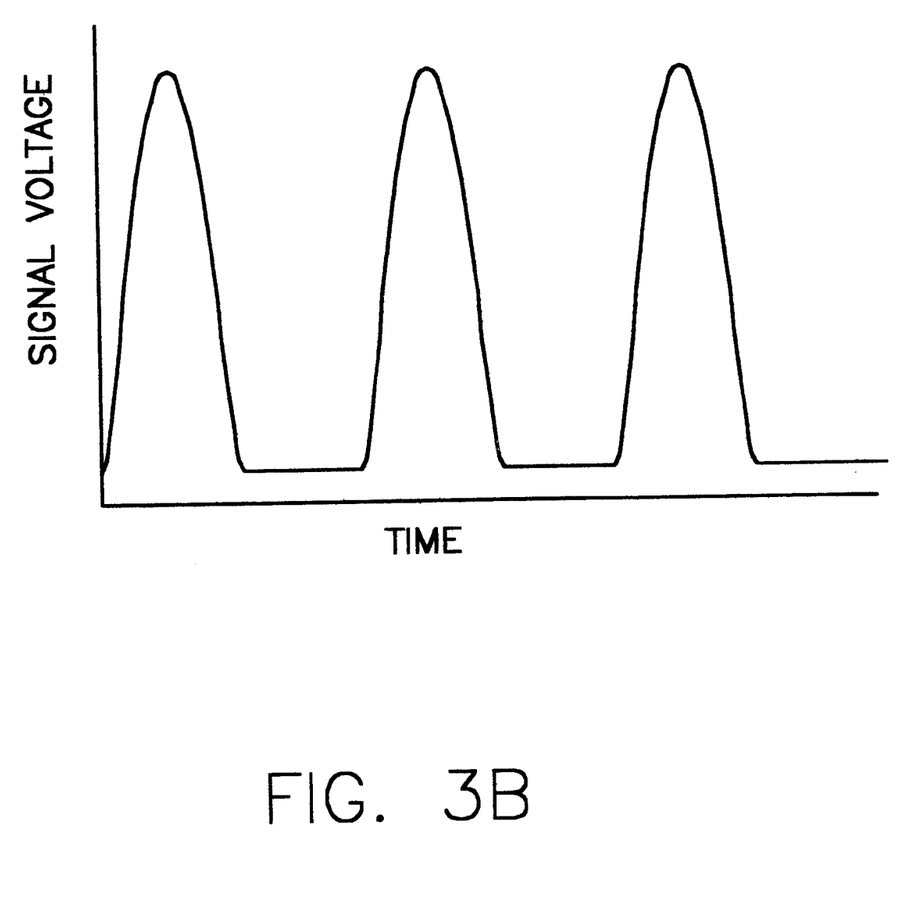
FIG. 3(b) is a graph of simulated output signal voltage vs. time for the rectifier of FIG. 3(a).

The simulated output waveform of the circuit in FIG. 3(a), when the input signal of FIG. 1(a) is applied, is shown in FIG. 3(b). As seen in FIG. 3(b), the circuit performs the half-wave rectification function, effectively blocking the negative part of the sinusoidal input waveform from passing to the output. The effect of putting the operational amplifier O1 in between the input voltage Vin and the gate of M1 is described by the following equations (based on the schematic in FIG. 4, which is a close-up of the operational amplifier of FIG. 3(a) and also indicates some variables used below).

Figure 4:
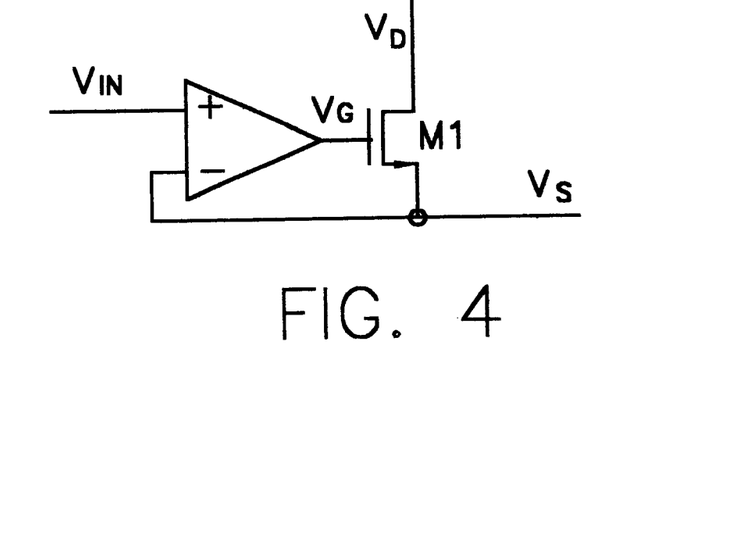
FIG. 4 illustrates an operational amplifier connected to improve MOSFET transconductance.

From the equation for the operational amplifier with voltage gain A, $$Vg = A*(Vin - Vs)$$

$$Vg - Vs = (A*Vin) - (Vs*(A+1))$$

If $A \gg 1$, $$Vg - Vs = A*(Vin - Vs)$$

From the simplified equation for the MOSFET device, the drain current, Id, is given by, $$Id = K*(Vg - Vs - Vth)^2$$

where K is a device dependent parameter, and Vth is the threshold voltage of the device.

The transconductance of the device (gm) is obtained by differentiating the drain current (Id) with respect the gate-to-source voltage (Vg–Vs), $$gm = 2*K*(Vg - Vs - Vth)$$

Writing (Vg–Vs) in terms of Vin from above, $$gm = 2*K*(A*(Vin - Vs) - Vth)$$

By adding the operational amplifier between the input voltage and the MOSFET device as shown in FIGS. 3(a) and 4, the effective transconductance of the MOSFET device is increased by a factor proportional to the gain of the operational amplifier. This in turn means that a smaller change in Vin is required to change the current in the MOSFET M1 from zero to the maximum possible value (which is determined by the magnitude of current in the current source MOSFET M3).

Figure 5:
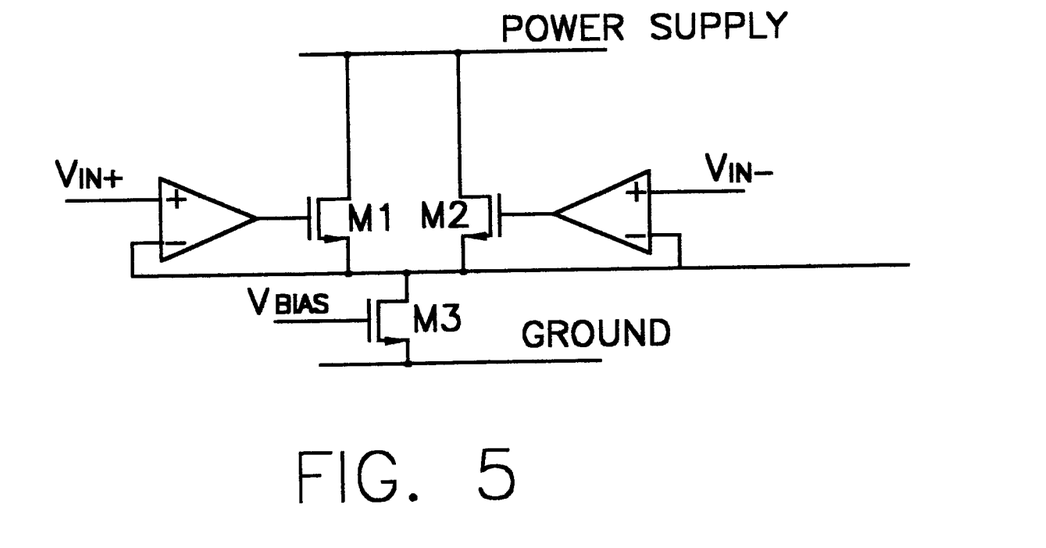
FIG. 5 illustrates a full-wave rectifier circuit with operational amplifier feedback ("Rectifier C").

FIG. 5 shows a full-wave rectifier based on the same principle. Vin+ is the input waveform and Vin− is the inverted version of the input waveform.

Figure 6A:
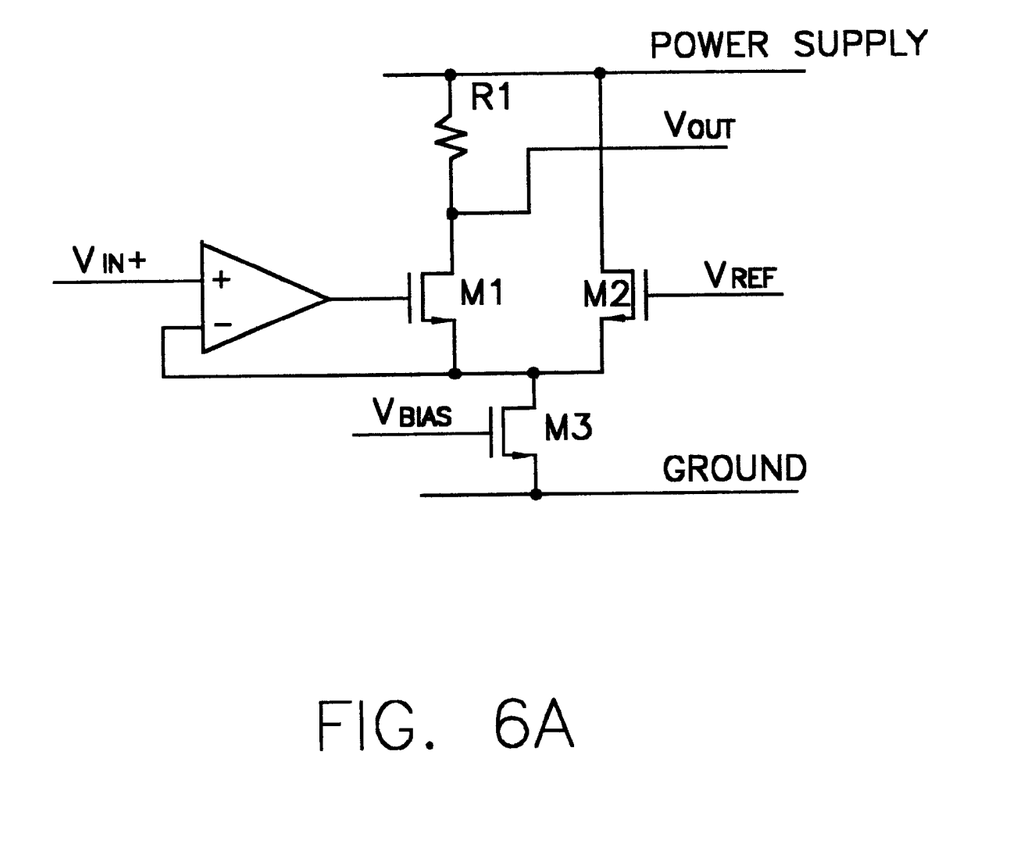
FIG. 6(a) illustrates a half-wave rectifier circuit with improved signal gain ("Rectifier D").
Figure 6B:
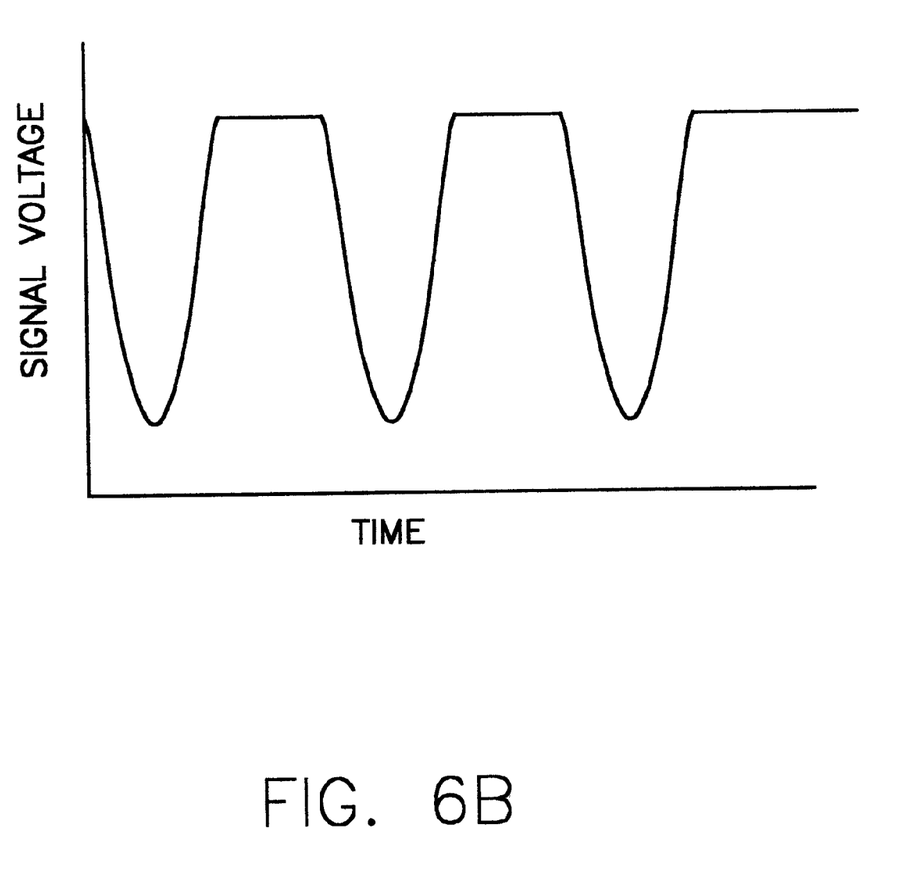
FIG. 6(b) is a graph of the simulated output signal voltage vs. time for the rectifier of FIG. 6(a).
Figure 7:
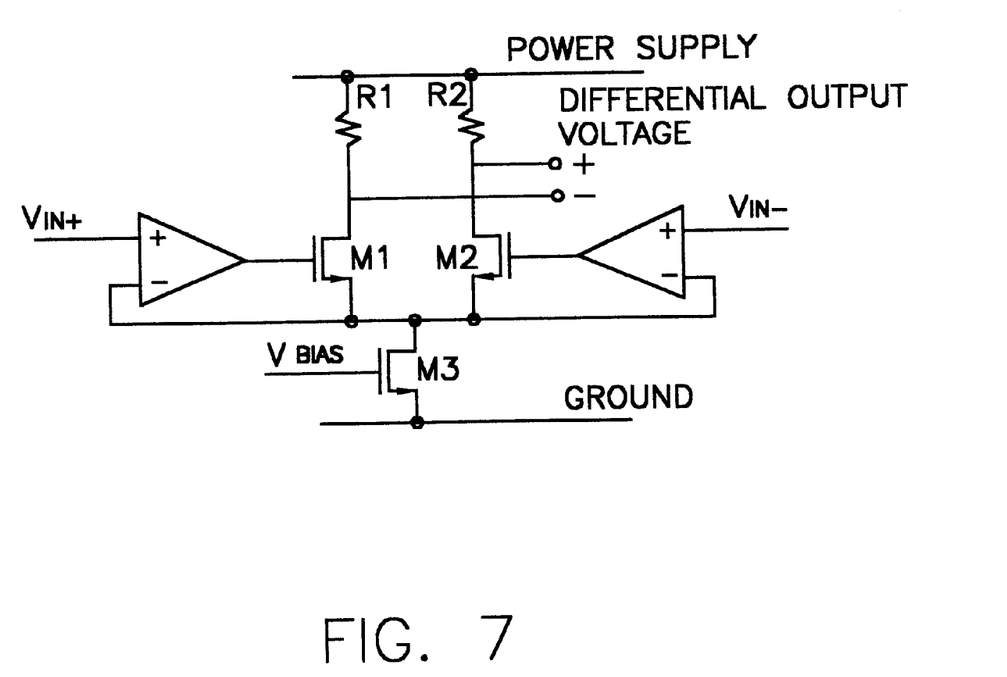
FIG. 7 illustrates a rectifier circuit with improved signal gain and differential output (Rectifier E).

The schematic of another circuit that benefits from the same improvement when the operational amplifier feedback is used, is shown in FIG. 6(a). This circuit is similar to the one in FIG. 3(a) in that it has two source-coupled MOSFETs (M1 and M2) which are connected to the current source MOSFET (M3), and the input voltage drives the gate of MOSFET M1 through the operational amplifier O1. The difference between this circuit and the one in FIG. 3(a) is that the output here is taken from the drain node of MOSFET M1, instead of the source-coupled node. This allows the use of the resistor R1 to provide additional gain in the circuit. The simulated output waveform of the circuit in FIG. 6(a), obtained when the input from FIG. 1(a) is applied, is shown in FIG. 6(b). Again, it can be seen that the half-wave rectification function has been effectively implemented. A differential version of the rectifier circuit of FIG. 6(a) is shown in FIG. 7.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A rectifier circuit comprising:

a current source transistor;

two transistors connected with said current source transistor; and an operational amplifier connected with said two transistors;

said two transistors and said current source transistors comprising MOSFETs;

said two transistors having a common node;

said operational amplifier having a negative input, said negative input being connected with said common node of said two transistors.

2. The rectifier circuit according to claim 1, wherein said operational amplifier accepts input voltage at a positive gate of said operational amplifier.

3. The rectifier circuit according to claim 1, wherein said operational amplifier comprises an output connected with a gate of said at least one transistor.

4. The rectifier circuit according to claim 1, wherein said rectifier circuit is a half-wave rectifier circuit.

5. The rectifier circuit according to claim 1, further comprising a circuit output connected with said node common to said two transistors.

6. The rectifier circuit according to claim 1, further comprising a circuit output connected with a drain node of one of said transistors.

7. The rectifier circuit according to claim 1, wherein said rectifier circuit is a full-wave rectifier circuit.

8. The rectifier circuit according to claim 7, wherein:

said operational amplifier is a first operational amplifier;

said rectifier circuit further comprising a second operational amplifier.

9. The rectifier circuit according to claim 8, wherein:

said first operational amplifier comprises an output connected with a gate of one of said two transistors.

10. The rectifier circuit according to claim 9, wherein said second operational amplifier comprises an output connected with a gate of the other of said two transistors.

11. The rectifier circuit according to claim 8, further comprising a differential circuit output.

* * * * *